United States Patent [19]

Tsai

[11] Patent Number: 4,927,284
[45] Date of Patent: May 22, 1990

[54] PEN-LIKE EYEGLASS CLEANER

[76] Inventor: Allan Tsai, 2nd Fl., No. 1, Lane 222, Tun-Hua N. Rd., Taipei, Taiwan

[21] Appl. No.: 368,810

[22] Filed: Jun. 20, 1989

[51] Int. Cl.$^5$ .............................................. G02C 13/00
[52] U.S. Cl. ........................................ 401/195; 7/165; 15/214; 401/23; 401/37; 401/196; 401/202
[58] Field of Search .................... 401/195, 23, 37, 196, 401/202; 15/214; 7/165

[56] References Cited

U.S. PATENT DOCUMENTS 4,389,132  6/1983  Valadez .............................. 401/195
4,818,134  4/1989  Tsai .................................... 401/195

Primary Examiner—Steven A. Bratlie
Attorney, Agent, or Firm—Oblon, Spivak, McClelland, Maier & Neustadt

[57] ABSTRACT

A pen-like eyeglass cleaner includes a hollow pen body having a first end and a second end, a wiping tip of absorbent material disposed on the first end of the pen body, a detergent container mounted detachably in the pen body, an amount of detergent held in the container, a roll of cleaning cloth mounted detachably in the pen body, and a cap which is sized to firmly cover the first end of the pen body and has a clip secured thereto. A magnifying glass is mounted detachably on the second end of the pen body. A screwdriver is mounted detachably on the clip.

6 Claims, 3 Drawing Sheets

PEN-LIKE EYEGLASS CLEANER

BACKGROUND OF THE INVENTION

This invention relates to a pen-like eyeglass cleaner, more particularly to a pen-like eyeglass cleaner which is suitable for use by far-sighted persons.

In my U.S. Pat. No. 4,818,134, I disclosed a cleaning pen for cleaning spectacle lenses in which a spectacle screwdriver is accommodated. Although the screwdriver of said invention can be used for the maintenance and repair of the spectacle frames, it is difficult to remove the screwdriver from the cleaning pen. In addition, when repairing spectacles, a magnifying glass is necessary for those who are far-sighted due to the fact that the screws associated with spectacles are small and cannot be seen clearly by such a person. Accordingly, it is desirable to detachably mount a magnifying glass on a pen-like eyeglass cleaner.

SUMMARY OF THE INVENTION

An object of this invention is to provide a pen-like eyeglass cleaner with an easily removable screwdriver mounted thereon.

Another object of this invention is to provide a pen-like eyeglass cleaner with a magnifying glass which is mounted detachably thereon.

According to this invention, a pen-like eyeglass cleaner includes a hollow pen body having a first end and a second end, a wiping tip of absorbent material disposed on the first end of the pen body, a detergent container mounted detachably in the pen body, an amount of detergent held in the container, a roll of cleaning cloth mounted detachably in the pen body, and a cap which is sized to firmly cover the first end of the pen body and has a clip secured thereto. A magnifying glass is mounted detachably on the second end of the pen body. A screwdriver is mounted detachably on the clip.

BRIEF DESCRIPTION OF THE DRAWINGS

Other features and advantages of this invention will become apparent in the following detailed description of the preferred embodiments of this invention, with reference to the accompanying drawings, in which.

DETAILED DESCRIPTION OF THE PREFERRED EMBODIMENTS

Figure 1:
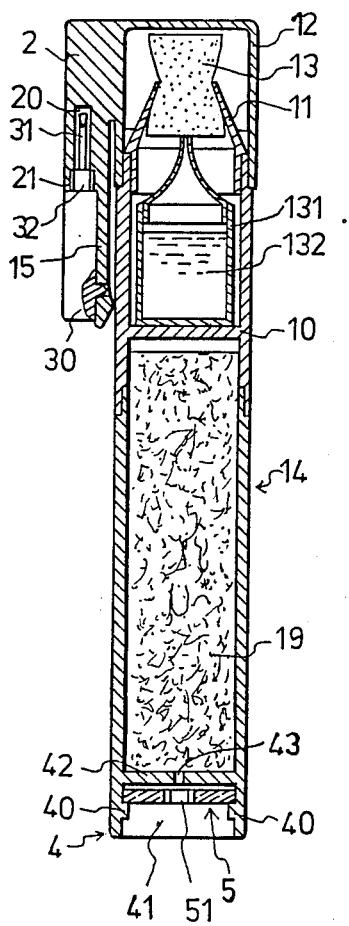
FIG. 1 is a sectional view of a pen-like eyeglass cleaner according to a first embodiment of this invention.

Referring to FIG. 1, a pen-like eyeglass cleaner of this invention includes a pen body 10, a cover 11, a cap 12, a wiping tip 13, a cylinder 14 and a clip 15. The wiping tip 13 is made of an absorbent material and extends through the cover 11. A detergent container 131 is fixed in the pen body 10 and is filled with a detergent 132 which can be fed into the wiping tip 13 when the pen body 10 is inverted. The cylinder 14 has an open upper end which is inserted tightly into the lower end of the pen body 10 so as to define therebetween a sealed chamber in which a roll of cleaning cloth 19 is contained. The clip 15 is secured to the cap 12.

Figure 2:
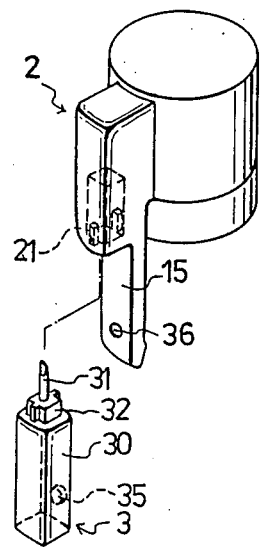
FIG. 2 is an exploded view showing the cap and the screwdriver of the eyeglass cleaner according to the first embodiment of this invention.

Referring to FIG. 2, the clip 15 includes a socket 2 disposed at the upper end portion thereof. The socket 2 has an elongated cavity 20. A spectacle screwdriver 3 is inserted tightly into the outer end portion 21 of the cavity 20 the cross-section of which is generally crisscrossed. The screwdriver 3 has a handle 30 which remains outside the cavity 20, a bit 31 which is positioned inside the cavity 20, and a generally crisscrossed intermediate portion 32 that interconnects the handle 30 and the bit 31, which is well-matched with the outer end of the cavity 20. To prevent the screwdriver 3 from falling out of the cavity 20, a protrusion 35 on one side of the screwdriver handle 30 is engaged with the hole 36 of the clip 15.

Figure 3:
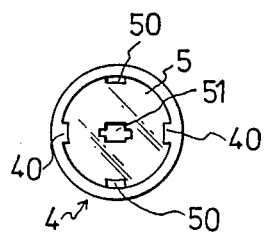
FIG. 3 is a bottom view showing the lower end portion of the eyeglass cleaner according to the first embodiment of this invention.
Figure 4:
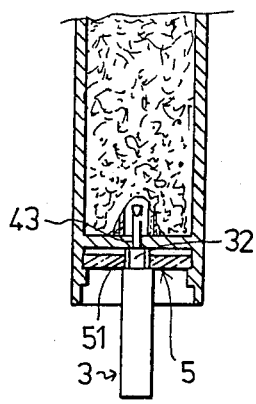
FIG. 4 is a schematic view illustrating how to remove the magnifying glass from the eyeglass cleaner in accordance with the first embodiment of this invention.

Referring to FIGS. 1 and 3, the lower and portion 4 of the cylinder 14 includes a cylindrical space 41 and two diametrically opposed projections 40 provided on the inner wall thereof. The upper end of the cylindrical space 41 is defined by a partition 42 which has a central hole 43. A magnifying glass 5 rests on the projections 40 in the cylindrical space 41 and has a generally crisscrossed central hole 51 formed therethrough, as well as two diametrically opposed circumferential notches 50 which are shaped in conformity with the projections 40. The central hole 51 of the magnifying glass 5 is shaped in conformity with the intermediate portion 32 of the screwdriver 3.

Figure 5:
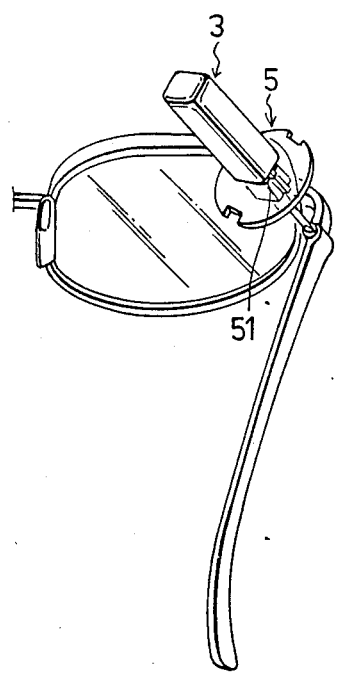
FIG. 5 is a schematic view illustrating the operation of the magnifying glass according to the first embodiment of this invention.

When the user wishes to remove the magnifying glass 5, he/she first removes the screwdriver 3 from the clip 15. Then, the user inserts the bit 31 of the screwdriver 3 into the central hole 43 of the partition 42 so as to engage the central hole 51 of the magnifying glass 5 with the intermediate portion 32 of the screwdriver 3. The magnifying glass 5 is then rotated until the notches 50 come into alignment with the projections 40. The magnifying glass 5 can therefore be carried by the screwdriver 3 out of the eyeglass cleaner so that the screwdriver 3 and the magnifying glass 5 can be used in the manner shown in FIG. 5.

Figure 6:
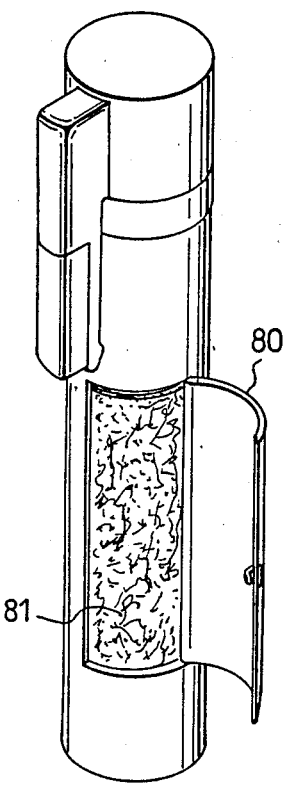
FIG. 6 is a perspective view of a pen-like eyeglass cleaner according to a second embodiment of this invention.

FIG. 6 shows an alternative embodiment of the pen-like eyeglass cleaner according to this invention in which the pen body 10 and the cylinder 14 of the previous embodiment are integrally formed. A roll of cleaning cloth 81 is contained within the interior chamber of the eyeglass cleaner. In this embodiment, a door 80 is mounted rotatably on the eyeglass cleaner. The door 80 can be opened so as to remove the roll of cleaning cloth 81 from the eyeglass cleaner.

Figure 7:
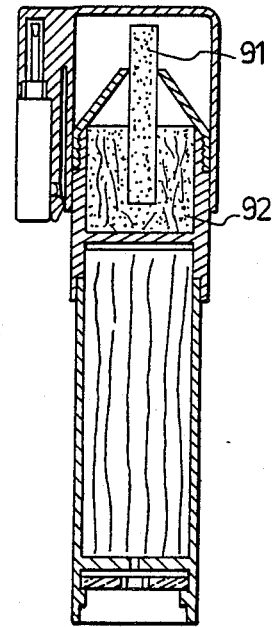
FIG. 7 is a perspective view of a pen-like eyeglass cleaner according to a third embodiment of this invention.

Referring to FIG. 7, an assembly of a wiping strip 91 and a non-woven cloth 92 is provided in place of the assembly of the wiping tip 13 and the detergent container 131.

It can be appreciated that the screwdriver and the cleaning cloth are mounted detachably on different portions of the pen-like eyeglass cleaner so as to enable either of them to be easily removed from said cleaner.

With this invention thus explained, it is apparent that numerous modifications and variations can be made without departing from the scope and spirit of this invention. It is therefore intended that this invention be limited only as indicated in the appended claims.

I claim:

1. A pen-like eyeglass cleaner including a hollow pen body having a first end and a second end, a wiping tip of absorbent material disposed on said first end of said pen body, a detergent container mounted detachably in said pen body, an amount of detergent which is held in said container, a roll of cleaning cloth mounted detachably in said pen body, and a cap which is sized to firmly cover said first end of said pen body and has a clip secured thereto, characterized by a magnifying glass mounted detachably on said pen body, and a screwdriver mounted detachably on said clip.

2. A pen-like eyeglass cleaner as claimed in claim 1, wherein said clip includes a socket disposed thereon, and said screwdriver has a handle and a bit and is inserted tightly into said socket in such a manner that said handle remains outside of said socket and abuts against a surface of said clip.

3. A pen-like eyeglass cleaner as claimed in claim 2, wherein said surface of said clip has a hole formed therein, and said handle of said screwdriver has a protrusion projecting from a side thereof which is engaged within said hole of said clip so as to retain said screwdriver on said clip.

4. A pen-like eyeglass cleaner as claimed in claim 1, wherein said pen body includes a cylindrical space formed in said second end, and two aligned projections provided on an inner wall of said pen body, said projections being positioned separately in said cylindrical space so as to prevent said magnifying glass from moving out of said cylindrical space, said magnifying glass having a central hole formed therethrough and two aligned circumferential notches, said notches being sized and positioned so that said projections may be passed through said notches, said screwdriver having an intermediate portion interconnecting said handle and said bit, said intermediate portion being shaped in conformity with said central hole of said magnifying glass, whereby, when said intermediate portion of said screwdriver is inserted tightly into said central hole of said magnifying glass, said magnifying glass can be rotated to engage said projections with said notches so as to remove said magnifying glass from said cylindrical space for use.

5. A pen-like eyeglass cleaner as claimed in claim 1, wherein said pen body includes a cylinder having an open end inserted tightly into said second end of said pen body for defining therebetween a sealed chamber in which said roll of said cleaning cloth is contained.

6. A pen-like eyeglass cleaner as claimed in claim 1, wherein said pen body includes an interior chamber containing said roll of said cleaning cloth therein, and a door mounted rotatably on said pen body, whereby, said door can be opened so as to remove said roll of said cleaning cloth from said interior chamber.

* * * * *